United States Patent [19]

Uzuka

[11] 4,412,159
[45] Oct. 25, 1983

[54] DRIVE CIRCUIT FOR AN ALTERNATE PHASE BRUSHLESS DC MOTOR

[75] Inventor: Mitsuo Uzuka, Urawa, Japan

[73] Assignee: Sony Corporation, Tokyo, Japan

[21] Appl. No.: 239,439

[22] Filed: Mar. 2, 1981

[30] Foreign Application Priority Data

Feb. 29, 1980 [JP] Japan .................................. 55-25798

[51] Int. Cl.³ .............................................. H02P 7/06
[52] U.S. Cl. ..................................... 318/254; 318/138; 318/439
[58] Field of Search ........................ 318/138, 254, 439

[56] References Cited

U.S. PATENT DOCUMENTS 4,217,508  8/1980  Uzuka .................................. 310/46
4,249,116  2/1981  Hieda .................................. 318/254

Primary Examiner—S. J. Witkowski
Attorney, Agent, or Firm—Lewis H. Eslinger; Alvin Sinderbrand

[57] ABSTRACT

A drive circuit for an alternate-phase brushless DC motor is arranged to minimize the torque ripple normally occurring with such motors. The motor has rotor magnets and at least two stator coils, and has a torque relationship in which the rotational torque for each coil extends over an electrical angle of more than 180 degrees and has gradual rising and falling portions intersecting with respective falling and rising portions of the torque of the other coil. The drive circuit includes a rotary position sensor, such as a Hall element, switching transistors for driving the stator coils, and switching signal forming circuitry responsive to the sensor to switch the switching transistors on and off alternately. In order to reduce the torque ripple, the drive circuit is made to energize the stator coils in the region of the intersections of the rotational torque, so that the coils are energized for more than 180 electrical degrees. In one preferred embodiment, a pair of additional switching transistors coupled to the stator coils are switched on by a circuit formed of a pair of differential amplifiers coupled to the Hall element and, through a logic gate, to the additional switching transistors.

24 Claims, 26 Drawing Figures

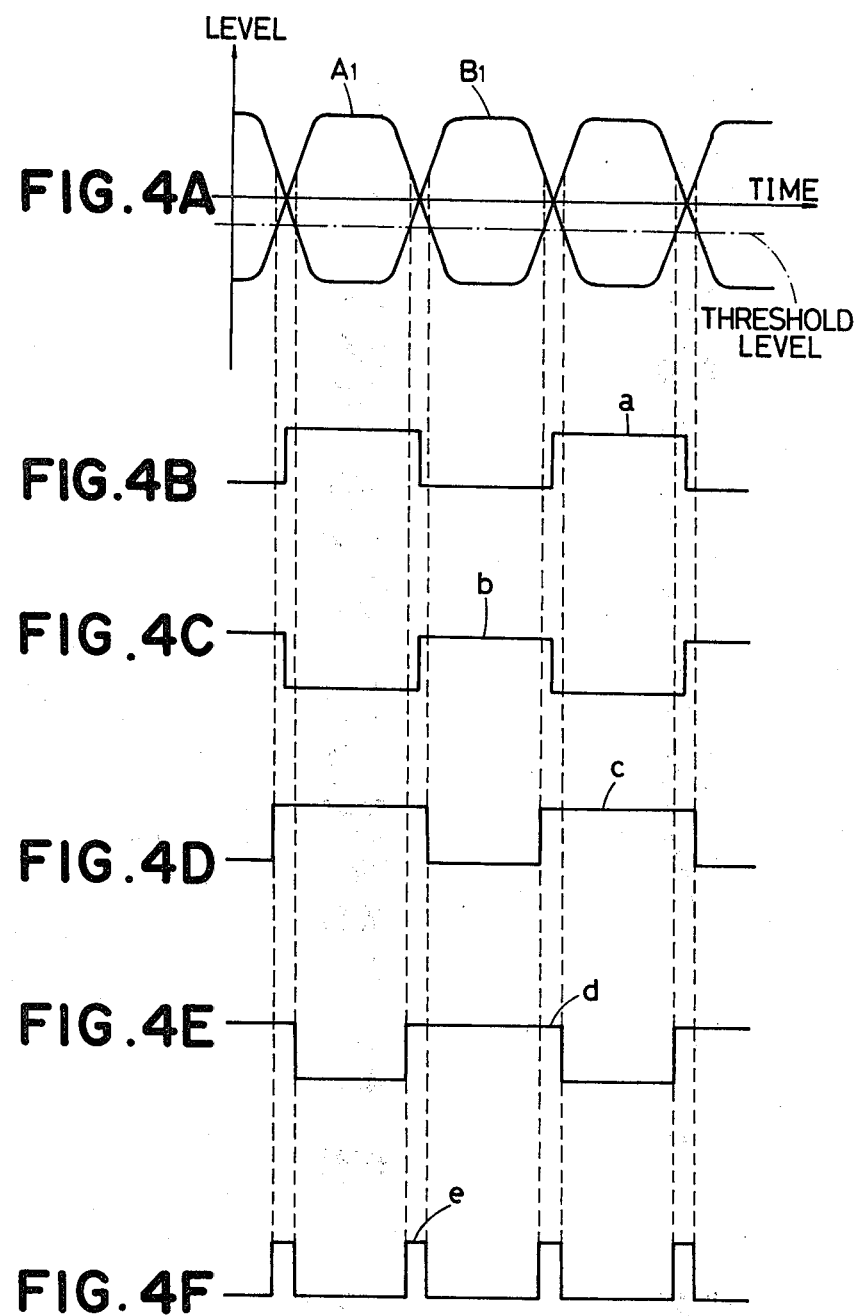

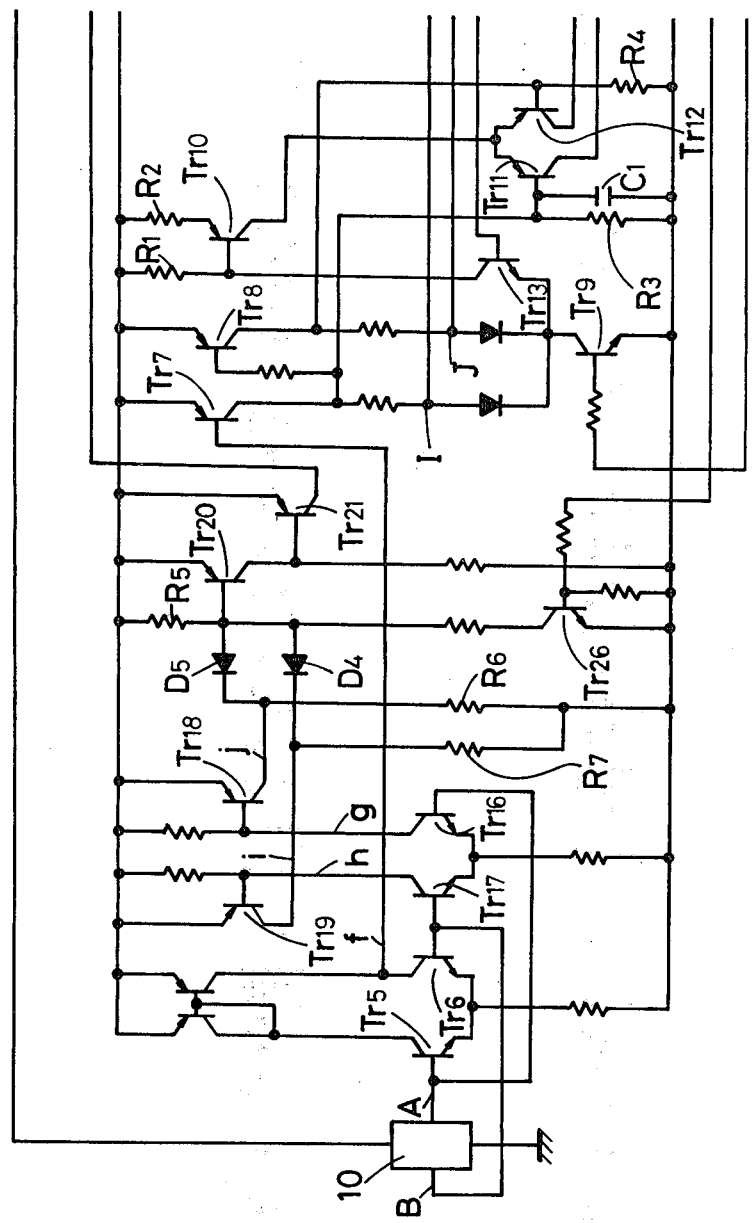

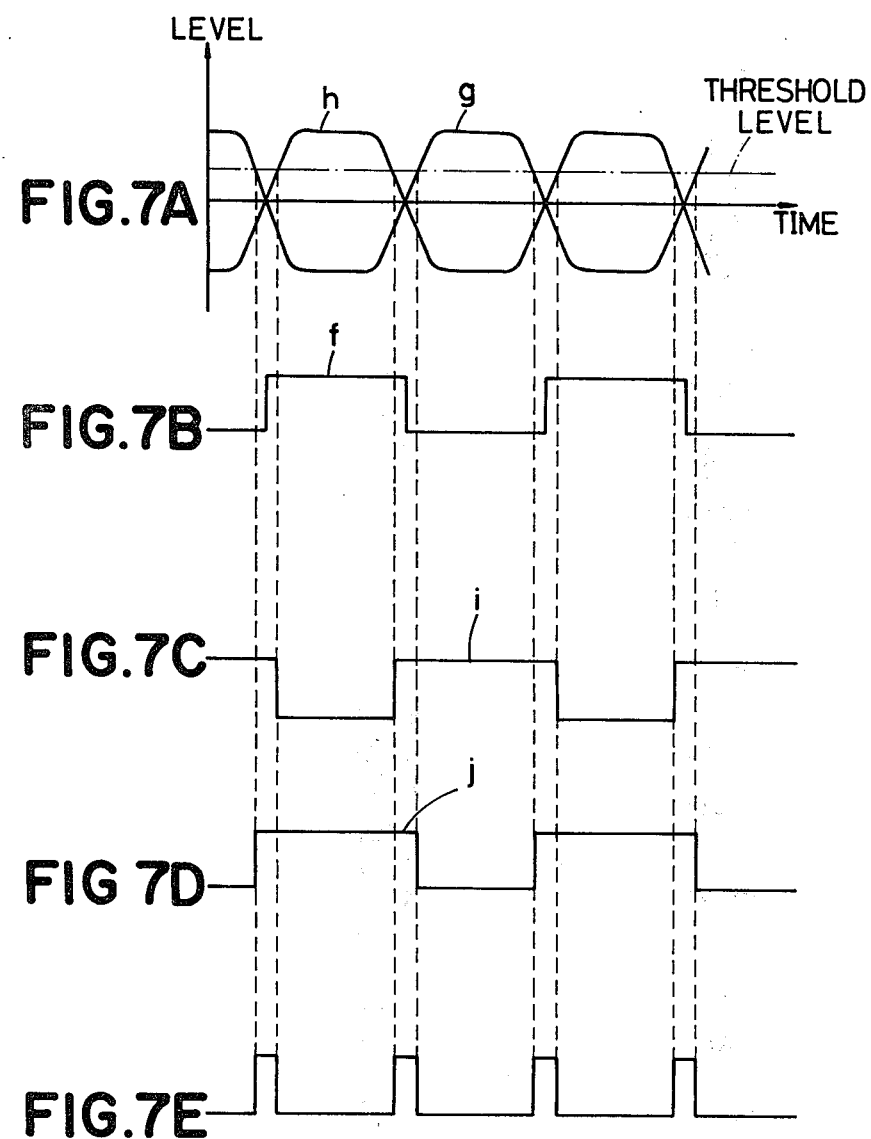

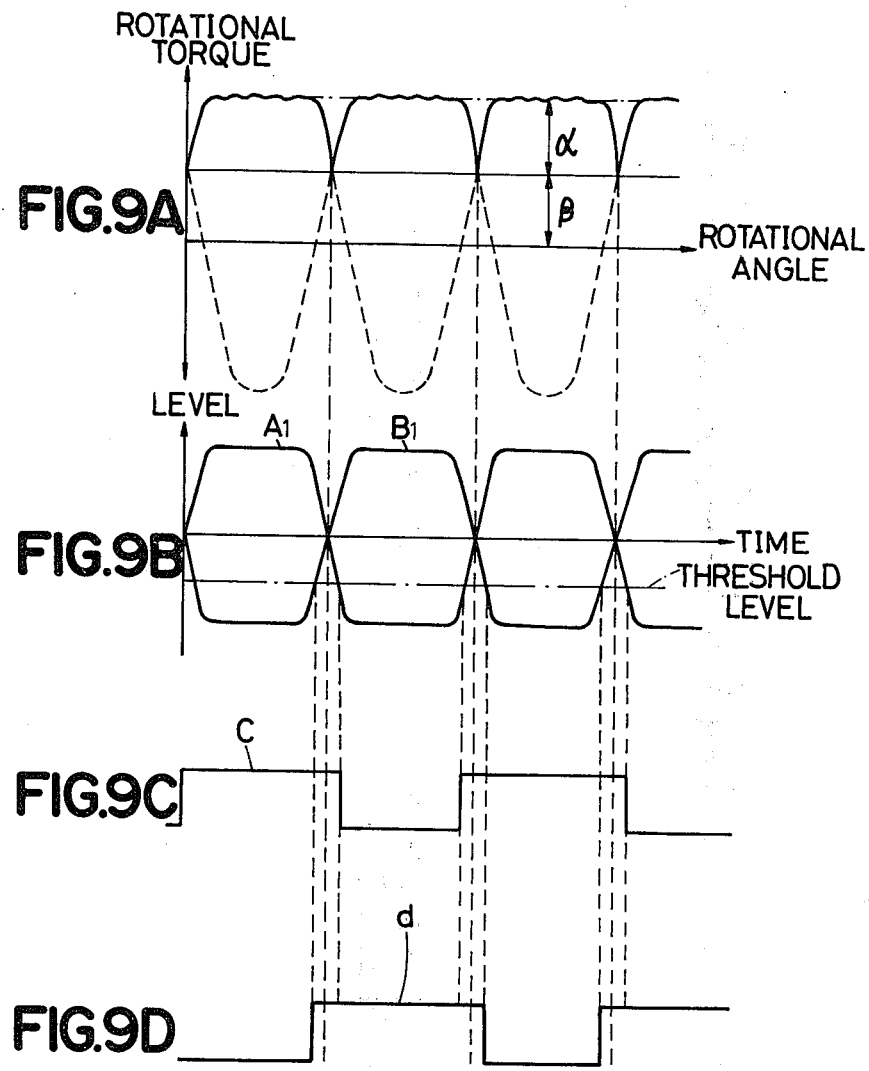

DRIVE CIRCUIT FOR AN ALTERNATE PHASE BRUSHLESS DC MOTOR

BACKGROUND OF THE INVENTION

1. Field of the Invention

This invention is directed to a drive circuit for an alternate phase brushless DC motor, and more particularly relates to a drive circuit arranged to minimize torque ripple.

2. Brief Description of the Prior Art

It has become common to reduce wow and flutter in VTRs cassette tape recorders, and the like, by incorporating therein a "direct drive system" including a superslow speed brushless DC motor directly connected to a reel mount for directly driving the latter. The so-called "direct drive system" also makes it possible to improve the operability and reliability of the system and to reduce the size of the system. However, a brushless motor having a remarkably small torque ripple has to be used to ensure that the wow and flutter are reduced. For this purpose, a brushless motor having an exceptionally high performance quality is necessary, but the narrow tolerances required to achieve such performance quality for that motor raise the production cost of the brushless DC motor to an unrealistically high level, and thereby make it difficult to put such a motor into practical use.

Therefore, with a view to reducing torque ripple, previous proposals have been made, including using non-conventional techniques for winding the armature coils, forming armature coils into non-conventional shapes, and altering the magnetizing pattern of the rotor magnets. However, while these proposals have had some success in reducing the torque ripple, such success has been limited and insufficient.

The following types of DC brushless motors are well known, and each has its own well known intrinsic operating characteristics and its own peculiar drawbacks:

(1) Three-Phase Unidirectional Energizing Type

In this type motor, three-phase coils are successively supplied with current in one direction. The motor of this type has a relatively simple circuit construction but has a drawback in that the torque ripple is quite high.

(2) Three-Phase Bidirectional Energizing Type

In this type motor, a selected two out of three three-phase coils are consecutively supplied with current in a selected direction, with the third coil being supplied with current in a constant direction, thereby to effect bidirectional operation. The motor of this type has its torque ripple reduced more than that of the type (1) but has a drawback in that its drive circuit construction is rather complex.

In motors of either of the aforementioned types (1) and (2), since the current change-over timing and the pole inverting timing overlap with each other, they each have a common drawback in that the torque drops upon current changeover.

(3) Sine-Wave Drive Type

In this type motor, a sinusoidal drive current, having a strength that varies in proportion to the linking magnetic fluxes of the respective alternate coils, is supplied to these coils so that the sum of the torques generated by the drive currents and the linking magnetic fluxes is a constant independent of the rotational angle of the rotor. The motor of this type can suppress the torque ripple to a rather low level, but requires extremely accurate adjustment of all circuit parameters. Furthermore, because it requires a double power source, which cannot easily be constructed to be efficient and small in size, this motor type is unsuitable for use where a small-sized motor is demanded.

(4) Alternate-Phase Switching Type

In this type motor, a unidirectional torque is generated in each phase of first and second alternate stator coils over an angle of more than 180 electrical degrees, and the first and second stator coils are alternately switched and supplied with power each 180 electrical degrees, thereby generating a continuous rotational torque. A constant, continuous rotational torque is provided except in the neighborhood of the current change-over times of the first and second stator coils.

However, since in such an alternate-phase brushless DC motor the torque drops somewhat upon a current change-over (or switching) operation, as shown in FIG. 2A below, it has a drawback in that unacceptable torque ripple results. Moreover, if this type of brushless DC motor is used, for example, as the capstan driving motor of a VTR, the wow and flutter that can result from this torque ripple, which has a significant high-frequency component, can result in jitter.

OBJECTS AND SUMMARY OF THE INVENTION

It is therefore an object of the present invention to provide a drive circuit for an alternate phase brushless DC motor so that the above-mentioned torque drop, which normally occurs upon the current change-over, is reduced.

Another object of the present invention is to reduce wow and flutter in a VTR, tape recorder, or the like, and to reduce the incidence of jitter, by providing therein an alternate-phase brushless DC motor incorporating the drive circuit of the present invention.

In accordance with an aspect of this invention, for each of the first and second stator coils, an overlap energizing current is provided in the neighborhood of the times of current change-over, to compensate for the torque drop that normally occurs at such times.

More specifically, in an embodiment of this invention, a drive circuit for an alternate phase brushless DC motor having at least first and second stator coils of alternate phase and a rotor including rotor magnets, the stator coils and the rotor magnets enjoying a rotational torque relationship such that the rotational torque for each coil extends over an electrical angle of more than 180 degrees and has gradual rising and falling portions having points of intersection with falling and rising portions, respectively, of the rotational torque of the other of the coils, comprises a sensing device, such as a Hall element, to detect the rotational position of the rotor magnets, a switching signal circuit providing alternate switching signals in response to the rotational position detected by the sensing device, and a pair of switching devices respectively coupled to the stator coils to alternately energize the latter in response to the respective alternate switching signals applied thereto. In order to reduce the torque ripple, the drive circuit includes torque correcting circuitry to cause an overlap energizing current flow through the first and second stator coils during the times that the rotor is in the vicinity of the above-mentioned points of intersection, so that the energizations of the stator coils overlap each other in phase. This torque correcting circuitry can include an additional pair of switching devices coupled to the respective stator coils for energizing the same prior to and following such points of intersection.

Other objects, features, and advantages of the invention will be apparent from the following description when read in conjunction with the accompanying drawings.

BRIEF DESCRIPTION OF THE DRAWINGS

FIG. 4A to FIG. 4F are waveform diagrams for explaining the operation of the motor driving circuit of FIG. 3;

FIG. 6A and FIG. 6B are circuit diagrams showing a motor driving circuit according to a second embodiment of this invention, in which the present invention is applied to the supply reel motor of a VTR;

FIG. 7A to FIG. 7E are waveform diagrams for illustrating the operation of the motor driving circuit of FIG. 6A and FIG. 6B;

FIG. 9A to FIG. 9E are diagrams for illustrating the operation of the motor driving circuit of FIG. 8.

DETAILED DESCRIPTION OF THE PREFERRED EMBODIMENTS

Figure 1:
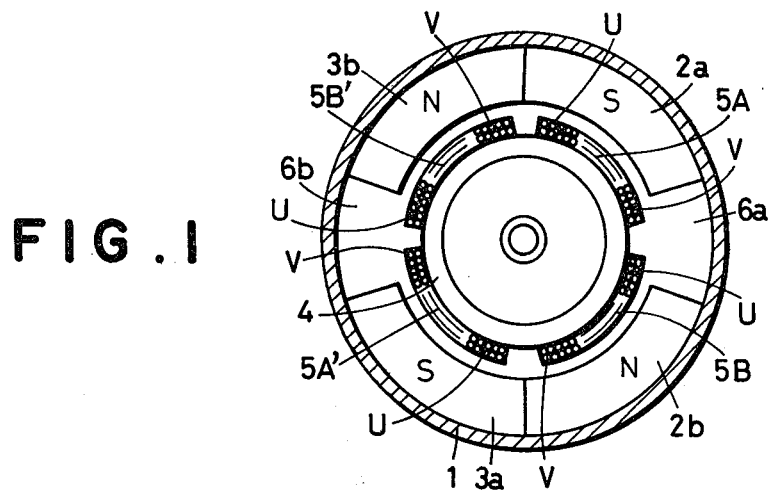
FIG. 1 is a cross-sectional view showing a four-pole alternate phase DC brushless motor to which this invention can be applied.

FIG. 1 is a cross-sectional view showing one example of an alternate phase brushless DC motor to which this invention can be applied. In this motor, a cylindrical outer yoke 1 has four permanent rotor magnets 2a, 2b, 3a and 3b fixed on its inner circumferential surface, while a stator core 4 is arranged coaxially with the rotor yoke 1 and has stator coils 5A and 5B, and 5A' and 5B' attached to its circumferential surface. Further, the stator coils 5A and 5A' are connected in series and are of the same electrical phase (hereinafter, phase A), while, similarly, the stator coils 5B and 5B' are also connected in series with each other and are of the same electrical phase (phase B).

The rotor magnets 2a, 2b, 3a and 3b each subtend an electrical angle of 140°. For example, if a boundary between the north polar magnets N and south polar magnets S is defined as an angular position or rotational angle of 0°, air gaps 6a and 6b, each occupying angles electrically extending from 140° to 220° are formed opposite to each other. Respective backward and forward current path portions U and V of the coils 5A and 5B, and 5A' and 5B' are separated from each other by an electrical angle of 100°.

It will be understood that the air gaps 6a and 6b serve to reduce the linking magnetic flux in the vicinity of an electrical angle of 180°.

Figure 2A:
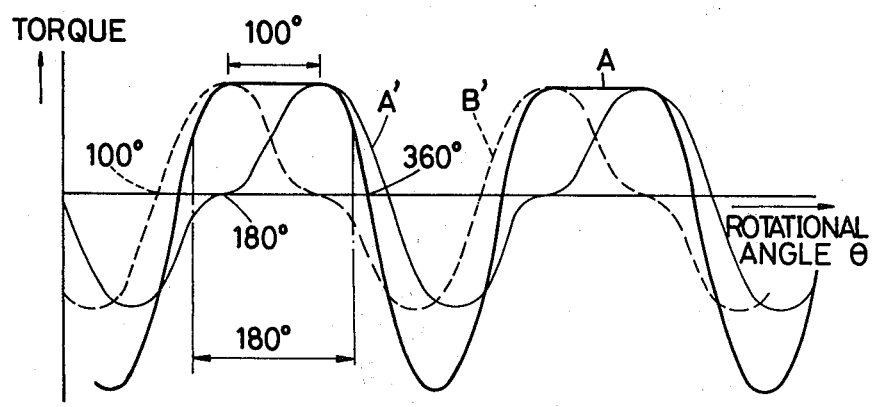
FIG. 2A and FIG. 2B are waveform diagrams illustrating the rotational torque pattern of the motor of FIG. 1.

FIG. 2A is a plot of the rotational torque generated by the A-phase stator coils (i.e., coils 5A and 5A'). Magnetic flux linking the forward current path portion V of the A-phase coils 5A and 5A' changes as shown by a thin line curve A'.

If current is continuously applied through the A-phase stator coils 5A and 5A' (i.e., for an electrical angle of 720°), a rotational torque shown by the curve A' is attributable to the forward current path portion V. At the same time, the current flowing through the backward current path portion U of the A-phase coils 5A and 5A' is opposite to the current flowing through the forward current path portion V thereof, and differs in phase therefrom by an electrical angle of 100°. Accordingly, rotational torque as shown by a dotted line curve B' is attributable to the backward current path portion U. A composite rotational torque shown by a solid line curve A is generated by the combined forward and backward current path portions V and U of the A-phase coils 5A and 5A'. In a conventional alternate phase DC brushless motor the stator coils 5A and 5A' are energized over an electrical angle of 180° corresponding to the span illustrated by the vertical chain lines on FIG. 2A, although the composite rotational torque A has the same sense or direction over an electrical angle exceeding 180°.

It will be observed that the rotational torque A is substantially flat over an electrical angle of 100°, and has gradually rising and falling portions extending the rotational torque to and beyond the above span of 180° during which current is normally applied to the stator coils.

The B-phase stator coils (i.e., stator coils 5B and 5B') produce a similar rotational torque, but offset by an electrical angle of 180° from that of coils 5A and 5A'. The rotational torque attributable to coils 5B and 5B' has a flat portion and gradually rising and falling portions having points of intersection with the falling and rising portions, respectively, of the rotational torque A attributable to stator coils 5A and 5A'.

The stator coils 5B and 5B' are also conventionally energized over spans of 180° electrical angle alternately with the stator coils 5A and 5A'. Normally, the current change-over between the A-phase stator coils 5A and 5A' and the B-phase stator coils 5B and 5B' occurs at the above-mentioned points of intersection of the rotational torque.

Figure 2B:
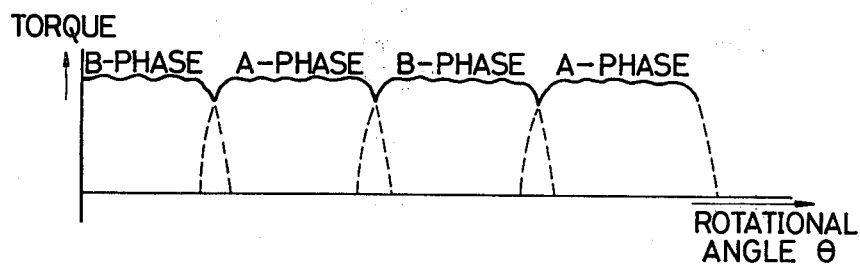

The total composite rotational torque from all the stator coils 5A, 5A', 5B, and 5B' thus has the relation depicted in FIG. 2B.

However, since the torque drops in the neighborhood the current changeover time (i.e., when switched), as shown in FIG. 2B, the conventional brushless DC motor thus far described has a drawback in that torque ripple occurs. Moreover, if this brushless motor is used as the capstan driving motor of a VTR, for example, the wow and flutter caused by the torque ripple have a significant high frequency component, which can cause jitter.

This invention eliminates the aforementioned disadvantage concomitant with the alternate phase switching type brushless DC motor and provides an alternate phase motor driving circuit that successively reduces the drop in torque occurring when the stator current is changed over by overlapping the respective energizing periods of the A-phase and B-phase stator coils 5A, 5A', and 5B, 5B'.

Several perferred embodiments of this invention will now be described with reference to FIG. 3 to FIG. 9.

Figure 3:
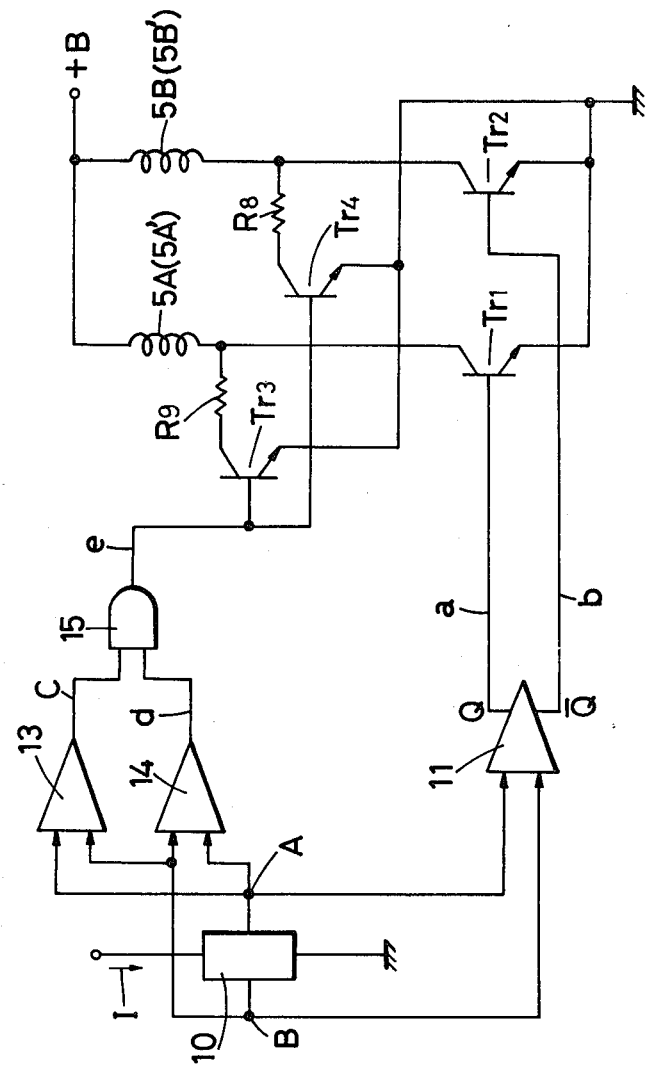
FIG. 3 is a circuit diagram showing a motor driving circuit according to a first embodiment of this invention.

FIG. 3 shows a motor driving circuit according to a first embodiment of this invention. Although not shown in FIG. 1, the brushless DC motor is equipped with position detecting magnets disposed on its rotor and with Hall elements or other equivalent detectors each opposite thereto and positioned on its stator.

In the drive circuit shown in FIG. 3, a Hall element 10 generates alternate output signals $A_1$ and $B_1$ (FIG. 4A) at outputs A and B thereof and such signals are applied to respective inputs of a differential amplifier 11. A current changeover signal a (FIG. 4B) is provided from an uninverted output terminal Q of the differential amplifier 11 while a complementary current change-over signal b (FIG. 4C) is provided from an inverted output terminal $\overline{Q}$ thereof. The change-over signals a and b alternate between high and low levels at intervals corresponding to electrical angles of 180°.

Current switching transistors $Tr_1$ and $Tr_2$ have their collectors respectively coupled in series with the A-phase and B-phase stator coils 5A, 5A' and 5B, 5B', and have their bases respectively coupled to receive the change-over signals a and b.

The stator coils 5A, 5A' and 5B, 5B' are also coupled to a power source +B.

Thus the transistors $Tr_1$ and $Tr_2$ are alternately turned on and off by the aforementioned signals a and b, so that the A-phase stator coils 5A and 5A' and the B-phase stator coils 5B and 5B' are intermittently energized, with each period of energization corresponding to an electrical angle of 180°. Consequently, the motor is driven in a predetermined rotational direction.

Meanwhile, the AC output signals $A_1$ and $B_1$, as shown in FIG. 4A, are furnished from the Hall element 10 to inputs of each of a pair of differential amplifiers 13 and 14. These differential amplifiers 13 and 14 are designed to have a predetermined threshold level as indicated by chain line in FIG. 4A. Accordingly, from the one differential amplifier 13 there is generated an output signal c (FIG. 4D), which takes on a high level when the level of the output signal $A_1$ is higher than the threshold level. Likewise, a corresponding output signal d (FIG. 4E) is generated from the other differential amplifier 14. Those output signals c and d are fed to inputs of an AND circuit 15, which in turn provides a pulse signal e (FIG. 4F) which takes on a high level in the vicinity of the points of intersection of the rotational torques, i.e., slightly before and slightly after the edges of the aforementioned current change-over signals a and b. The pulse signal e from the AND circuit 15 is fed to each of the bases of a pair of torque-correction transistors $Tr_3$ and $Tr_4$ which have their collectors respectively coupled through collector resistors $R_9$ and $R_8$ to the stator coils 5A, 5A' and 5B, 5b'.

Thus the transistors $Tr_3$ and $Tr_4$, which are rendered conductive when the pulse signal e is applied at a high level, serve to supply an overlap energizing current to the stator coils 5A, 5A' aND 5B, 5B' to compensate the above-mentioned torque drop.

Figure 5A:
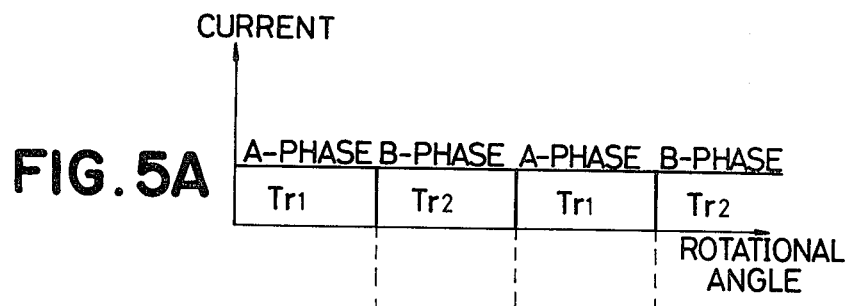
FIG. 5A to FIG. 5C are waveform diagrams for explaining the operation of the motor driving circuit of FIG. 3.
Figure 5B:
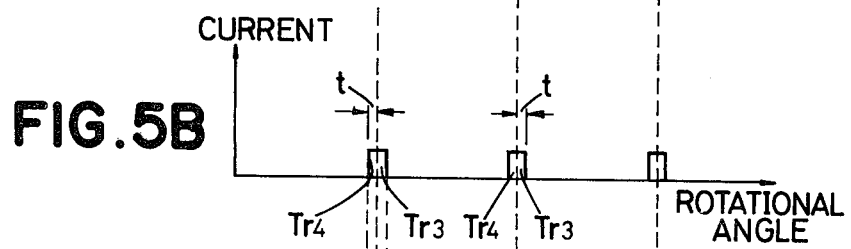
Figure 5C:
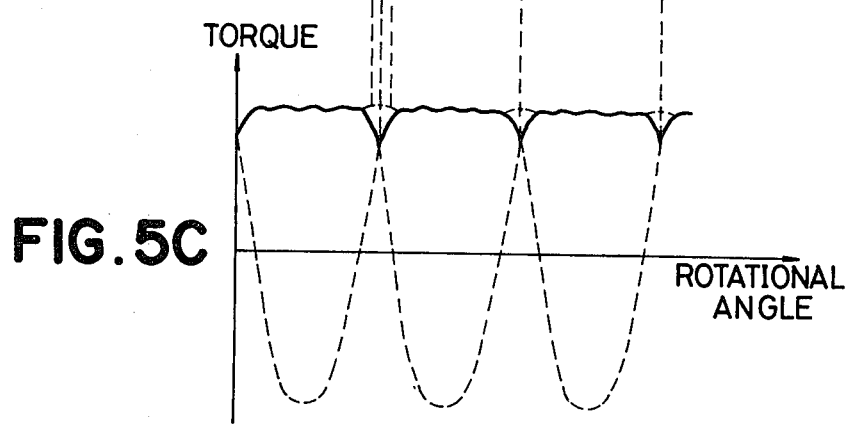

As a result, in the motor driving circuit thus constructed, the A-phase stator coils 5A and 5A' are energized over the period for which the transistor $Tr_1$ is kept conductive by the current change-over signal a from the differential amplifier 11, as shown in FIG. 5A. Moreover, as shown in FIG. 5B, immediately before the transistor $Tr_1$ is switched from its conductive to its non-conductive state in response to the aforementioned current change-over signal a, the transistor $Tr_4$ is rendered conductive by the pulse signal e so that the B-phase stator coils 5B and 5B' are energized over a predetermined period t immediately before the time of current change-over. Correspondingly, if the transistor $Tr_1$ is switched to its non-conductive state whereas the transistor $Tr_2$ is switched to its conductive state, the B-phase stator coils 5B and 5B' are energized by the current change-over signal b. At this current change-over time, since the transistor $Tr_3$ is rendered conductive by the pulse signal e, the A-phase stator coils 5A and 5A' are energized over the predetermined period t immediately after the current is changed over, as is also shown in FIG. 5B.

As result, since the A-phase stator coils 5A and 5A' and the B-phase stator coils 5B and 5B' are energized together in an overlapping manner in the neighborhood of (i.e., before and after) the instant when the phase shift is accomplished from A to B or from B to A, the torque of the motor has its drop compensated during current change-over. As indicated at the dotted curve line in FIG. 5C, the torque characteristics are flattened. That is, the "valleys" between A and B current phases in the torque curve shown in FIG. 2B are filled in due to energization of the transistors $Tr_3$ and $Tr_4$.

Incidentally, the compensation of the torque drop can be set at any desired value by selecting the values of the respective collector resistors $R_9$ and $R_8$ of the transistors $Tr_3$ and $Tr_4$.

It should also be recognized that although the transistors $Tr_3$ and $Tr_4$ are turned on and rendered conductive, they do not both carry current at the same time. For example, when the transistor $Tr_1$ is conductive, that transistor dominates and no current flows through the transistor $Tr_3$. Similarly, current flows through the transistor $Tr_4$ only before and after the energizing period of the transistor $Tr_2$.

FIG. 6A and FIG. 6B, and FIG. 7A to FIG. 7E are presented for explaining another embodiment, in which the present invention is applied to a reel motor driving circuit for a magnetic tape recorder.

Elements in this embodiment that are common to the embodiments of FIG. 3 are identified with the same reference characters, and a detailed description thereof is omitted.

First of all, the AC output signals $A_1$ and $B_1$, as shown in FIG. 7A, which are generated from the output terminals A and B of the Hall element 10 in response to the detected rotation of the rotor magnets 2A, 2B, 3A and 3B, are fed to the bases of transistors $Tr_5$ and $Tr_6$ which are arranged as a differential amplifier. As a result, a pulsating current change-over signal f, as shown in FIG. 7B, is generated from the collector of the transistor $Tr_6$. This current change-over signal f is fed to the base of a transistor $Tr_7$ whose collector is coupled to the base of another transistor $Tr_8$ so that the transistors $Tr_7$ and $Tr_8$ are alternately turned on and off every electrical angle of 180°.

A switching transistor $Tr_9$ has its collector coupled to the collectors of the transistors $Tr_7$ and $Tr_8$ and has a control voltage, as appropriate to the forward and backward rotation of the supply reel motor, applied from a power source terminal 20 to its base. The transistor $Tr_9$ is switched on and off in accordance with this control voltage.

When the supply reel motor is rotating in the forward direction (i.e., for a tape-rewinding operation), a voltage at a high level is applied from the power source terminal 20 to the base of the transistor $Tr_9$ and thereby renders the transistor $Tr_9$ conductive. During the backward rotations (for a fast-forward operation), a voltage at a low level is fed from the power source terminal 20 to the base of the transistor $Tr_9$ and thereby switches the transistor $Tr_9$ to its non-conductive state.

Initially, the operation of the circuit for forward rotation of the motor will be described.

A switch SW has a movable contact coupled to the stator coils 5A, 5A', 5B and 5B' and has a fixed terminal $V_R$ coupled to the power source terminal 20 and another fixed terminal $V_S$ connected to receive a rotational speed controlling voltage, which can be the output of a tape tension servo.

For forward operation the movable contact of the switch SW is coupled to the terminal $V_S$, and a high level is applied from the power source terminal 20 to the transistor $Tr_9$ to render it conductive.

The transistors $Tr_7$ and $Tr_8$ provide, from their respective collectors, pulse signals according to the aforementioned current change-over signal f, and the respective pulse signals are fed to a current change-over circuit formed of transistors $Tr_{10}$ to $Tr_{15}$, resistors $R_1$ to $R_4$, and capacitors $C_1$ to $C_3$. Specifically, the aforementioned respective pulse signals are applied to the bases of the transistors $Tr_{11}$ and $Tr_{12}$, which have their emitters coupled to the collector of the transistor $Tr_{10}$, and whose collectors are coupled to the bases of the switching transistors $Tr_{15}$ and $Tr_{14}$, respectively. These switching transistors $Tr_{14}$ and $Tr_{15}$ are connected to energize the stator coils 5A, 5A' and 5B, 5B', respectively.

The resistors $R_1$ and $R_2$ respectively connect the base and emitter of the transistor $Tr_{10}$ to a supply voltage $V_{CC}$, while the resistors $R_3$ and $R_4$ are respectively coupled from ground to the bases of the transistors $Tr_{11}$ and $Tr_{12}$ to bias the same. The capacitor $C_1$ is coupled in parallel with the resistor $R_3$.

If a pulse signal at a low level is fed from the collector of the transistor $Tr_7$ to the base of the transistor $Tr_{11}$, this transistor $Tr_{11}$ is rendered conductive so that a current I flows through the resistor $R_2$ and the transistors $Tr_{10}$ and $Tr_{11}$. As a result, the transistor $Tr_{15}$ is turned on. Correspondingly, if a pulse signal at a low level is fed from the collector of the transistor $Tr_8$ to the base of the transistor $Tr_{12}$, this transistor $Tr_{12}$ is turned on to then actuate the transistor $Tr_{14}$.

Thus, the A-phase coils 5A and 5A' and the B-phase coils 5B and 5B' are alternately energized. Incidentally, the capacitors $C_2$ and $C_3$, here arranged in parallel with the transistors $Tr_{14}$ and $Tr_{15}$, serve to prevent noise.

The collector voltages, during the time that the respective transistors $Tr_{14}$ and $Tr_{15}$ are conductive, are detected by means of a detecting circuit formed of diodes $D_1$, $D_2$, and $D_3$, and the detected voltages are fed to a base current controlling circuit formed of the transistors $Tr_{13}$ and $Tr_{10}$ and resistors $R_1$ and $R_2$. The diode $D_1$ has its cathode connected to the junction of the collector of the transistor $Tr_{15}$ with the stator coils 5B, 5B' and the diode $D_3$ has its cathode connected to the junction of the collector of the transistor $Tr_{14}$ with the stator coils 5A, 5A'. The diode $D_2$ has its anode joined to the anodes of the diodes $D_1$ and $D_3$ and has its cathode connected to the base of the transistor $Tr_{13}$.

The detected collector voltage from the transistors $Tr_{14}$ and $Tr_{15}$ is furnished through the transistor $Tr_{13}$ to control the current flowing to the transistor $Tr_{10}$, which, in turn, controls the amount of current flowing through the transistors $Tr_{11}$ and $Tr_{12}$. As a result the transistors $Tr_{11}$ and $Tr_{12}$ furnish sufficient base current $I_B$ to drive the transistors $Tr_{14}$ and $Tr_{15}$ to saturation, but do not permit such base current to become excessive.

The operation of this circuitry can be explained as follows.

Figure 6B:
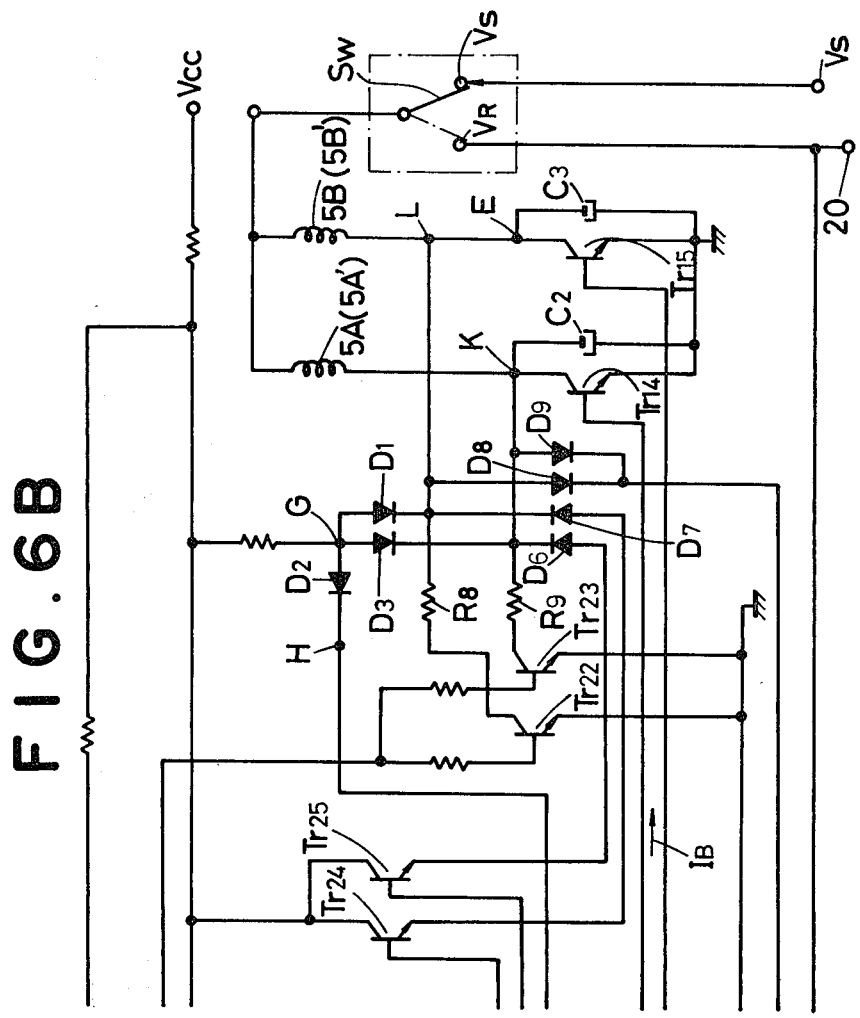

The voltage at point G in FIG. 6B assumes a value which is the resultant of the collector voltage of the transistors $Tr_{14}$ and $Tr_{15}$ in their conductive states and the forward voltage of the diodes $D_1$ and $D_3$. Therefore, the voltage at the cathode (i.e., at point H in FIG. 6B) of the diode $D_2$ equals the resultant collector voltage of the transistors $Tr_{14}$ and $Tr_{15}$. This collector voltage is fed to the base of the transistor $Tr_{13}$ to regulate the collector current of the latter. Then, the collector current of the transistor $Tr_{13}$ flows through the resistor $R_1$ to control the base voltage of the transistor $Tr_{10}$. The collector current of the latter transistor is determined in accordance with its base voltage. Then, the collector current of the transistor $Tr_{10}$ flows as the base current $I_B$ for the switching transistors $Tr_{14}$ and $Tr_{15}$ when the transistors $Tr_{11}$ and $Tr_{12}$ are alternately made conductive.

For example, if the respective base currents of the transistors $Tr_{14}$ and $Tr_{15}$ exceed the current necessary to drive the same to their proper saturation levels, the voltage at the point H becomes so low that the collector current of the transistor $Tr_{13}$ is reduced. As a result, the collector current of the transistor $Tr_{10}$ is also reduced. Consequently, the base currents $I_B$ of the switching transistors $Tr_{14}$ and $Tr_{15}$ are reduced. By contrast, if the base current $I_B$ is insufficient, the diodes $D_1$–$D_3$ and the transistors $Tr_{13}$ and $Tr_{10}$ act to increase the base currents $I_B$ for the transistors $Tr_{14}$ and $Tr_{15}$. An equilibrium condition is quickly attained, in which the collector voltages of the transistors $Tr_{14}$ and $Tr_{15}$ at the point H substantially equals the base-emitter voltage (i.e., a level of about 0.7 V) of the transistor $Tr_{13}$. In such an equilibrium condition, the collector-emitter voltages of the switching transistors $Tr_{14}$ and $Tr_{15}$ takes on a value of about 0.7 V, which is very close to the substantially saturated voltage.

In other words, even if the amplitude of the current to be fed to the coils 5A, 5A', 5B and 5B' is changed in dependence upon the intensity of the supply voltage $V_s$ fed to the coils 5A, 5A', 5B and 5B', only the minimum base current necessary for saturating the transistors $Tr_{14}$ and $Tr_{15}$ flows to their respective bases. Consequently, a high base current necessary for starting the motor can be provided, and when the motor attains its properly rated rotational speed, the base current is automatically reduced to the minimum necessary level. Thus, the power consumed by the motor can be further reduced.

In the present embodiment, moreover, the respective energizing periods of the A-phase stator coils 5A and 5A' and the B-phase stator coils 5B and 5B' are made to overlap each other slightly, just before and just after the current change-over time, as in the FIG. 3 embodiment. More specifically, the AC output signals, as shown in FIG. 7A from the output terminals A and B of the Hall element 10 are supplied to the bases of a pair of transistors $Tr_{16}$ and $Tr_{17}$ arranged as a differential amplifier, so that amplified output voltages, as shown by g and h in FIG. 7A, are generated from the collectors of these differentially-arranged transistors $Tr_{16}$ and $Tr_{17}$. The resultant output voltages are supplied to the bases of another pair transistors $Tr_{18}$ and $Tr_{19}$, respectively. Since these transistors $Tr_{18}$ and $Tr_{19}$ are biased to have an ON level (i.e., a threshold level), as shown in FIG.

7A, a pair of pulse signals i and j having high level sections overlapping each other, as shown in FIGS. 7C and 7D, respectively, are generated from the collectors of those transistors $Tr_{18}$ and $Tr_{19}$. Such pulse signals signals i and j take on high levels when the signals h and g drop below their respective threshold levels.

A pair of diodes $D_4$ and $D_5$ have their respective cathodes connected to the collectors of the transistors $Tr_{19}$ and $Tr_{18}$. The anodes of the diodes $D_5$ and $D_6$ are coupled to the base of a transistor $Tr_{20}$. A biasing resistor is connected to the base of the transistor $Tr_{20}$, while collector resistors $R_6$ and $R_7$ are respectively coupled to the collectors of the transistors $Tr_{18}$ and $Tr_{19}$.

Since the cathode potentials of the diodes $D_4$ and $D_5$ are raised while both the pulse signals i and j take on high levels, no current flows at such times through a path consisting of the resistor $R_5$, the diode $D_5$, the resistor $R_6$, the resistor $R_7$, and the diode $D_4$. As a result, the base potential of the transistor $Tr_{20}$ is increased in the neighborhood of the stator current change-over time, as shown in FIG. 7E, and this transistor $Tr_{20}$ is rendered non-conductive just before and just after such change-over times.

Another transistor $Tr_{21}$ has its base coupled to the collector of the transistor $Tr_{20}$ and is accordingly rendered conductive in the neighborhood of the stator current change-over time. Since the collector potential of the transistor $Tr_{21}$ rises when it is rendered conductive, a pair of overlap switching transistors $Tr_{22}$ and $Tr_{23}$, whose bases are coupled to the collector of the transistor $Tr_{21}$, are made conductive thereby. These transistors $Tr_{22}$ and $Tr_{23}$ are respectively coupled, through the collector resistors $R_8$ and $R_9$, to the stator coils 5B, 5B' and 5A, 5A'.

If, for example, the A-phase stator coils 5A and 5A' are energized by the current change-over signal f shown in FIG. 7B, a torque-compensating current for compensating the torque ripple flows through the B-phase stator coils 5B and 5B' in the neighborhood of the current change-over time. Correspondingly, if the B-phase stator coils 5B and 5B' are energized, the torque compensating current flows through the A-phase stator coils 5A and 5A'.

With the drive circuit of this embodiment, the drop of the torque at the current change-over time can be compensated by feeding the compensating current through the overlap energizing transistor $Tr_{22}$ or $Tr_{23}$ to the stator coils 5A and 5A' or 5B and 5B' which would otherwise not be conducting. Thereby, the torque characteristics of the motor are substantially flattened.

Incidentally, the compensation for the torque drop can be set at any desired level by adjusting the collector resistors $R_8$ and $R_9$ of the transistors $Tr_{22}$ and $Tr_{23}$.

The description thus far is directed to the circuitry of FIGS. 6A and 6B when operated in a forward rotational mode. At this time, the supply reel motor generates the torque opposite to the direction of translation of the magnetic tape and thus, owing to the low torque ripple of the motor, provides a remarkably even back tension to the magnetic tape.

The operation of the circuit for reverse rotation of the motor will now be described.

To achieve reverse operation the switch SW is switched from the rotational speed controlling voltage terminal $V_S$ to the reversing voltage terminal $V_R$. Then, a voltage at a low level (e.g., ground level) is fed from terminal 20 through the aforementioned terminal $V_R$ to one terminal of each of the stator coils 5A and 5A', and 5B and 5B'. It should be remarked that in the fast-forward mode the supply reel motor rotates in its reverse direction, corresponding to the direction of translation of the magnetic tape, whereby the tape running load is lightened.

The low voltage at the terminal 20 is also fed to the base of the transistor $Tr_9$ so that this transistor $Tr_9$ is rendered non-conductive.

For driving the motor in the reverse direction, the drive circuit includes a pair of switching transistors $Tr_{24}$ and $Tr_{25}$ whose collectors are coupled together to the power source $V_{CC}$ and whose collectors are respectively coupled through diodes $D_6$ and $D_7$ to the stator coils 5A, 5A' and 5B, 5B'. The bases of the switching transistors $Tr_{24}$ and $Tr_{25}$ are respectively coupled to the collectors of the transistors $Tr_7$ and $Tr_8$.

When, during a reverse operation, the transistor $Tr_7$ (or $Tr_8$) is turned on, the collector potential of the transistor $Tr_7$ (or $Tr_8$) is raised so that the potential at point I (or J) in FIG. 6A is raised to render the transistor $Tr_{24}$ (or $Tr_{25}$) conductive. In such a fashion, the transistor $Tr_{24}$ and $Tr_{25}$ are alternately turned on and off at equal intervals in dependence upon the aforementioned current change-over signal f.

It will be understood that in the reverse rotational mode, current passes from the power source $V_{cc}$ through the A-phase stator coils 5A and 5A' and the B-phase stator coils 5B and 5B' in the direction opposite to that in the forward rotational mode. As a result, the motor is driven in the backward direction.

In this case, since the transistor $Tr_9$ is non-conductive, the transistors $Tr_{13}$ and $Tr_{10}$ are both non-conductive as are the transistors $Tr_{11}$ and $Tr_{12}$. As a result, since no base current $I_B$ is supplied to the transistors $Tr_{14}$ and $Tr_{15}$, the current for forward drive, as has been described before, is not supplied to the A-phase and B-phase stator coils 5A, 5A' and 5B, 5B'. In the forward rotational mode, on the other hand, the aforementioned pair of transistors $Tr_{24}$ and $Tr_{25}$ are both held non-conductive so that no current for reverse drive will flow.

As further shown in FIG. 6A, a reference switching transistor $Tr_{26}$ is coupled to the base of the transistor $Tr_{20}$ and has its base coupled through diodes $D_8$ and $D_9$ to the stator coils 5A, 5A' and 5B, 5B'. Thus, when a reverse rotational mode is selected, the transistor $Tr_{26}$ is operative to render both the overlap energizing transistors $Tr_{22}$ and $Tr_{23}$ non-conductive. Consequently, when the supply reel motor is switched to its rewinding mode (or the take-up reel motor is switched to its fast forward mode) so that a voltage at a high level is applied to the terminal 20 and the motor is in its reverse rotational mode, the transistors $Tr_{22}$ and $Tr_{23}$ are prevented from heating. However, when the motor torque is used to apply back tension upon the supply reel in the recording or reproducing mode, the transistor $Tr_{26}$ is left non-conductive, and the overlap energizing transistors $Tr_{22}$ and $Tr_{23}$ are alternately turned on and off, as in the foregoing description, thereby providing compensation for torque drop.

On the contrary, in the high-speed forward rotation such as during a fast-forward operation, potentials at the points K and L take on high levels. The voltages at the points K and L are detected by means of the diodes $D_8$ and $D_9$ and the transistor $Tr_{26}$ is switched to its conductive state in response to such detected voltage. As a result, the transistor $Tr_{20}$ is turned on, whereas the transistor $Tr_{21}$ is turned off. Since, as a consequence, the overlap energizing transistors $Tr_{22}$ and $Tr_{23}$ are rendered inoperative, the heat liberated therein is reduced. While no torque-ripple correction is performed, torque ripple in the motor does not present any significant problem in the rewind and fast-forward operations.

FIGS. 8 and 9A-E show a motor driving circuit according to a third embodiment of this invention. Elements of this embodiment in common with those appearing in the first two embodiments are identified with the same reference characters, and a detailed explanation thereof will not be repeated.

Figure 8:
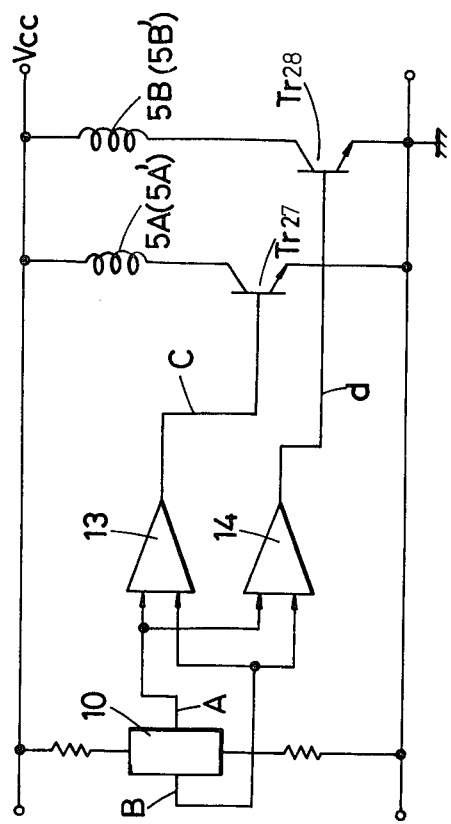
FIG. 8 is a circuit diagram showing a motor driving circuit according to a third embodiment of this invention.

In this embodiment, as is apparent from FIG. 8, there are not provided the separate overlap energizing transistors $Tr_3$ and $Tr_4$ and the torque compensation adjusting resistors $R_8$ and $R_9$ which are used in the first embodiment. Here, the AC output signals $A_1$ and $B_1$ (FIG. 9B) from the output terminals A and B of the Hall element 10 are fed to inputs of each of a pair of differential amplifiers 13 and 14. The differential amplifiers 13 and 14 each have a differential output coupled to the respective bases of switching transistors $Tr_{27}$ and $Tr_{28}$ arranged for energizing the stator coils 5A, 5A' and 5B, 5B', respectively.

In this embodiment, the transistors $Tr_{27}$ and $Tr_{28}$ are each turned on for a period exceeding an electrical angle of 180°, in response to the output signals generated by the differential amplifiers 13 and 14. The A-phase and B-phase stator coils 5A and 5A', and 5B and 5B' are alternately energized in an overlapping manner.

In this embodiment, the torque curves of the A-phase and B-phase stator coils intersect at the position of substantially half of peak torque as shown in FIG. 9A to take on a relationship of $\alpha = \beta$, where $\alpha$ is the difference in torque from the torque at the points of intersection to maximum torque, while $\beta$ is the amount of torque at the points of intersection. This relation $\alpha = \beta$ is achieved either by changing the magnetizing patterns of the magnets $2a$, $2b$, $3a$ and $3b$ of FIG. 1 or by changing the pitch angle (i.e., the angular spacing between the forward path portion V and the backward path portion U) of the stator coils 5A, 5A', 5B and 5B'. Similarly to the first embodiment, pulse signals c and d, as shown in FIGS. 9C and 9D, are generated from the differential amplifiers 13 and 14 so that the transistors $Tr_{27}$ and $Tr_{28}$ are both rendered conductive over a period t', as shown in FIG. 9E. In other words, those transistors $Tr_{27}$ and $Tr_{28}$ supply current for an electrical angle of $180° + \gamma$, where $\gamma$ is a positive angle. As a result, an overlap energizing operation is performed over the aforementioned period t' so that the torque drop at the current change-over time can be ideally compensated to the same level as that of the flat portion of the A-phase and B-phase torques, as indicated by chain lines in FIG. 9A. In this embodiment, this compensation is achieved by the simultaneous application of current to the A-phase and to the B-phase stator coils 5A, 5A', and 5B, 5B'.

With the construction of this embodiment, because the resistors $R_8$ and $R_9$ are omitted, very little heat is liberated, and the driving circuit is highly suited to be formed as an integrated circuit.

Although several particular embodiments of this invention have been described in detail herein with reference to the accompanying drawings, it is to be understood that the invention is not limited to those precise embodiments and that various changes and modifications may be effected therein by persons skilled in the art without departing from the scope of spirit of the invention as defined in the appended claims.

What is claimed is:

1. A drive circuit for an alternate phase brushless DC motor having at least first and second stator coils of alternate phase and a rotor including rotor magnets, the stator coils and the rotor magnets having a rotational torque relationship such that the rotational torque for each coil extends over an electrical angle of more than 180° and has gradual rising and falling portions having points of intersection with falling and rising portions, respectively, of the rotational torque of the other coil, the drive circuit comprising:

sensing means for sensing the rotational position of said rotor magnets;

and switching means for alternately energizing said first and second stator coils in dependence on the rotational position of said rotor magnets as determined by said sensing means so that such energization occurs substantially between said points of intersection, wherein said switching means includes a first pair of switching elements for alternately energizing said first and second stator coils for respective electrical angles of 180° commencing and ending substantially at successive points of intersection so that simultaneous energization of said coils by said first pair of switching elements is substantially avoided; and correcting means comprising a second pair of switching elements coupled to said stator coils for energizing by predetermined amounts said first and second stator coils, respectively, prior to and following said points of intersection to provide a predetermined period of simultaneous energization of said stator coils at said points of intersection and thereby minimize torque ripple.

2. A drive circuit according to claim 1, wherein said correcting means further includes first and second switching signal forming circuits coupled to said sensing means, and providing first and second switching signals, respectively, to said first and said second pairs of switching elements.

3. A drive circuit according to claim 2, wherein said sensing means includes a Hall element having first and second outputs and said first switching signal forming circuit includes a differential amplifier having inputs coupled to said first and second outputs of said Hall element, and having alternate outputs coupled to the respective elements of said first pair of switching elements.

4. A drive circuit according to claim 3, wherein said second switching signal forming circuit includes first and second differential amplifiers each having a predetermined threshold and each having a pair of input terminals coupled to the first and second outputs of said Hall element and providing a differential output whenever the level of the respective outputs of said Hall element reach said predetermined threshold so that the differential output of each of said first and second differential amplifiers extends over an electrical angle of more than 180°, and an AND gate having inputs coupled to said differential outputs of said first and second differential amplifiers and an output coupled to said second pair of switching elements, so that the latter are switched on during overlapping occurrences of said differential outputs and, as a result, said simultaneous enegizing current flows through said stator coils.

5. A drive circuit according to claim 1, wherein said correcting means includes a pair of resistors respectively coupled in series with said stator coils and said second pair of switching elements to limit the simultaneous energizing current to a value appropriate to minimize said torque ripple.

6. A drive circuit according to claim 1, wherein each of said first pair of switching elements includes a transistor having a current-carrying electrode coupled to a respective one of said first and second stator coils, and each of said second pair of switching elements includes a transistor having a current-carrying electrode also coupled to a respective one of said first and second stator coils.

7. A DC brushless motor comprising a rotor, a stator including at least first and second stator coils, and drive means for energizing said stator, wherein:
said rotor includes at least one pair of permanent magnets of opposite polarity disposed in rotational sequence and means for reducing the intensity of magnetic flux linking said stator coils at a position rotationally between said magnets;
said first and second stator coils are disposed in rotational sequence to face said permanent magnets, each of said coils having a current path portion for current in one direction spaced from a current path portion thereof for current in the opposite direction by an electrical angle of less than 180°; and
said drive means includes switching means comprising a first pair of switching elements for alternately applying an energizing current to said first and second stator coils over an electrical angle substantially equal to 180° so that simultaneous energization of said coils by said first pair of switching elements is substantially avoided and a second pair of switching elements for applying energizing currents of predetermined amounts to said first and second stator coils so that a period is provided when energizing currents are simultaneously applied to said coils to minimize torque ripple.

8. A drive circuit for an alternate phase brushless DC motor having at least first and second stator coils of alternate phase and a rotor including rotor magnets, the drive circuit comprising:
sensing means for sensing the rotational position of said rotor magnets,
a first pair of switching transistors having respective collectors coupled to said stator coils for alternately energizing said stator coils while substantially avoiding simultaneous energization thereof, said first pair of switching transistors forming respective junctions with said stator coils,
switching signal forming means for providing a switching signal to energize said first pair of switching transistors in dependence upon the rotational position of said rotor magnets determined by said sensing means,
correcting switching means including a second pair of switching transistors having collectors respectively coupled to said first and second stator coils, and
means for energizing said second pair of switching transistors for a sufficient period of time prior to and following the energization of said first pair of switching transistors to provide simultaneous energization of said coils by predetermined amounts during said period so that torque ripple in said DC motor is minimized.

9. A drive circuit according to claim 8 further comprising collector voltage detecting means coupled to the collector of each of said first pair of switching transistors for controlling the associated transistor of said second pair of switching transistors so that the latter are switched on only when the associated switching transistors of said first pair thereof are switched off.

10. A drive circuit according to claim 9, wherein said collector voltage detecting means includes a first pair of diodes each with first and second electrodes, the first electrodes of said pair of diodes being coupled to the respective collectors of said first pair of switching transistors, and another diode also with similar first and second electrodes, the second electrode of the other diode being coupled to the second electrodes of said first pair of diodes, so that a voltage substantially equal to the collector voltage of each of said first pair of switching transistors is provided at the first electrode of said other diode.

11. A drive circuit according to claim 9, wherein each transistor of said first and second pairs of switching transistors includes a control electrode; and wherein said drive circuit further comprises current controlling means for controlling the current applied to said first pair of switching transistors in response to the detected collector voltage, so that said first pair of switching transistors are energized only to the minimum extent necessary for them to be switched on.

12. A drive circuit according to claim 11, wherein said current controlling means includes a base current source circuit providing a base current in response to the detected collected voltage, and analog gate circuit means for transmitting said base current to the control electrodes of said first pair of transistors in response to alternate switching signals applied thereto from said switching signal forming means.

13. A drive circuit according to claim 12, wherein said current controlling means, said collector voltage detecting means, and said switching signal forming means form a closed loop circuit operative to maintain the collector voltage of each of said first pair of switching transistors at a substantially constant value by increasing the control current to said control electrodes when said collector voltage is reduced below such constant level and by decreasing the control current when said collector voltage is enlarged above such constant level.

14. A drive circuit according to claim 8, further comprising supply voltage detecting means coupled to the junctions of said first and second stator coils with said first pair of switching transistors for detecting the level of voltage applied to said stator coils and providing an output, and threshold switching circuit means coupled to said means energizing said second pair of switching transistors for inhibiting operation of the latter whenever the output of said threshold switching circuit means is above a predetermined threshold corresponding to higher-speed operation of said DC motor, thereby preventing excessive heat generation in said second pair of switching transistors during such higher-speed operation.

15. A drive circuit according to claim 14, wherein said said supply voltage detecting means includes a pair of diodes each having first and second electrodes, with the first electrode of each of said diodes being coupled to a respective one of said junctions, and the second electrodes thereof being coupled together and providing the detected level of voltage applied to the stator coils.

16. A drive circuit according to claim 14, wherein said threshold switching circuit means includes a switching transistor having output electrodes coupled between said switching signal forming means and a point of constant voltage, and a control electrode coupled to the output of said supply voltage detecting means.

17. A drive circuit according to claim 8, further comprising a third pair of switching transistors for driving said motor in a reverse direction, said third pair of transistors being coupled to said stator coils to energize the latter in the sense opposite to the energization provided thereto by said first pair of switching transistors.

18. A drive circuit according to claim 17, further comprising a pair of diodes respectively coupled between said third pair of switching transistors and said junctions of said stator coils and said first pair of switching transistors, each one of said third pair of switching transistors having a control electrode coupled to said switching signal forming means.

19. A drive circuit according to claim 18, further comprising switch means for selectively coupling said first and second stator coils to a source of servo-controlled power for forward operation and to another source of power for reverse operation.

20. A drive circuit according to claim 19, further comprising switching transistor means coupled to said switch means for inhibiting said switching signal forming means from energizing said first pair of switching transistors when a reverse operation is selected.

21. A drive circuit for an alternate phase brushless DC motor having at least first and second stator coils of alternate phase and a rotor including rotor magnets, the stator coils and the rotor magnets having a rotational torque relationship such that the rotational torque for each coil extends over an electrical angle of more that 180° and has gradual rising and falling portions having points of intersection with falling and rising portions, respectively, of the rotational torque of the other coil, the drive circuit comprising:

sensing means for providing first and second outputs indicating the rotational position of said rotor magnets, switching means including first and second switching elements respectively coupled to said first and second stator coils for alternately energizing said first and second stator coils, each of said switching elements having a control terminal, and a switching signal forming circuit responsive to said sensing means to provide switching signals to said switching elements so that said switching elements energize said first and second stator coils for at least an angular extent from one point of intersection to the next, corresponding to an electrical angle of 180°, said switching signal forming circuit including first and second differential amplifiers having predetermined threshold levels and each having an output coupled to said control terminal of a respective switching element and a pair of inputs respectively coupled to the first and second outputs of said sensing means for providing said switching signal for an extent exceeding 180° of electrical angle so that said stator coils are each energized sufficiently in advance of said one point of intersection and after said next point of intersection to minimize torque ripple.

22. A drive circuit according to claim 21, wherein said sensing means includes a Hall element.

23. A drive circuit according to claim 22, wherein said first and second switching elements are transistors having current-carrying electrodes respectively coupled to said first and second stator coils.

24. A drive circuit according to claim 21, wherein said rotor further includes means cooperative with said rotor magnets for reducing the intensity of magnetic flux linking said stator coils at a position rotationally between said rotor magnets.

* * * * *